Figure 1:
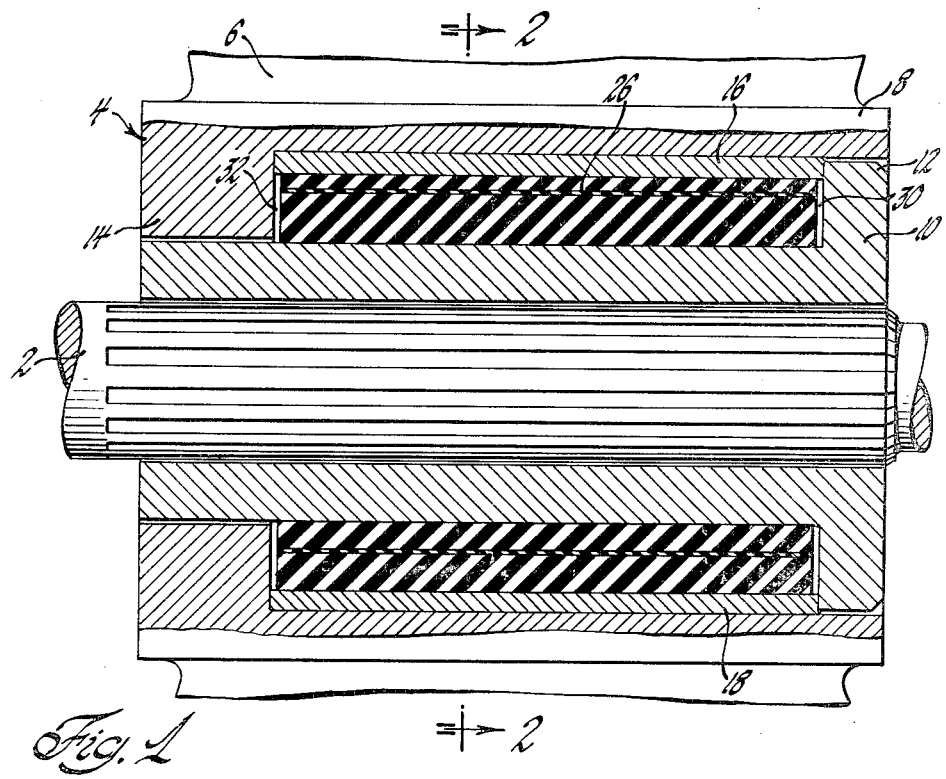

INVENTOR.
Lysle I. Benjamen
BY
Barnard, McGlynn & Reising
ATTORNEYS

United States Patent Office                                          3,212,296
                                                                  Patented Oct. 19, 1965

3,212,296
TORQUE LIMITING CLUTCH
Lysle I. Benjamen, 951 N. Adams, Birmingham, Mich.
Filed Feb. 11, 1963, Ser. No. 257,660
8 Claims. (Cl. 64—30)

The subject matter of this invention is an improved slip clutch connection between driving and driven rotary members which serves to protect the driving member from destructive overload by reason of too high a torque demand from the driven member and which additionally serves as a vibration damper between the driving and driven members. The invention finds particular utility in marine propellers and will be described in detail specifically with reference to this embodiment; however, it will be understood that the invention can also be used in other types of drive mechanisms where it is desirable to incorporate a protective overload clutch.

It is currently the common practice in small marine craft propulsion systems to incorporate some means in the driveshaft-to-propeller connection to protect against destructive overload on the driveshaft in the event the propeller hits an obstruction such as a log, seaweed, or the like. The most common practice is to use a shear pin. While this has the advantage of low cost, it has the serious disadvantage of requiring insertion of a new shear pin, with attendant propeller disassembly and reassembly, each time there is a destructive overload. Various types of slip clutches have been proposed to implement or replace the conventional shear pin; however, all have been lacking in one or several characteristics essential to complete success. One such characteristic, for example, is that of high torque transmitting efficiency and therefore practically no slippage during normal operation. Another is relative simplicity of construction and attendant low manufacturing cost.

It is an object of the present invention to provide an improved slip clutch which effects highly efficient torque transmission between driving and driven rotary members during normal operation, but which assures against any damage being done in the event of an overload on the driven member. Another object is the provision of a slip clutch which is of relatively simple and therefore low cost construction and yet is extremely durable with little or no requirement for maintenance. More specifically, it is an object of the invention to provide a driveshaft-to-propeller connection for marine propulsion systems which efficiently transmits torque from the shaft to the propeller during normal propeller operation, but which allows free slippage between the shaft and the propeller in the event the propeller hits an obstruction or otherwise places too high a torque demand on the shaft.

Briefly, these objects are accomplished in accordance with the invention by an assembly which includes a resilient connection haivng one end secured to either the driving or the driven rotary member and the other end secured to a friction element which is in engagement with the other of the members, the resilient connection being such that it presses the friction element into rotation inducing engagement with the one member during normal operation but relieves the pressure when there is an abnormally high torque demand from the driven member. In the preferred embodiment for marine propellers, the resilient connection comprises a single sheet of elastomer material concentrically wound around the propeller hub, the inner end of the sheet being secured to the hub and the outer end being secured to a generally cylindrically shaped expansible friction element engageable with a sleeve which carries the propeller blades and which constitutes the driven member. The spirals of the concentrically wound elastomer sheet have interposed therebetween a layer of lubricative material such that they can slide with respect to each other thereby allowing the sheet to be more easily wound up as the shaft rotates after the propeller has stopped. Hence, during normal operation, torque is transmitted from the shaft through the elastomer and friction element to the propeller, the elastomer resiliently biasing the friction element into non-slipping frictional engagement with the propeller sleeve; however, in the event the propeller hits an obstruction, the shaft winds up the elastomer sheet more tightly to reduce its radial dimension, thereby relieving the pressure on the friction element and causing it to slip with respect to the propeller sleeve. In addition to providing the slippage required to prevent torque overload, the resilient connection also serves as a vibration damper in the connection and thereby inhibits the transmission of shock or vibration from the propeller to the driveshaft.

Figure 2:
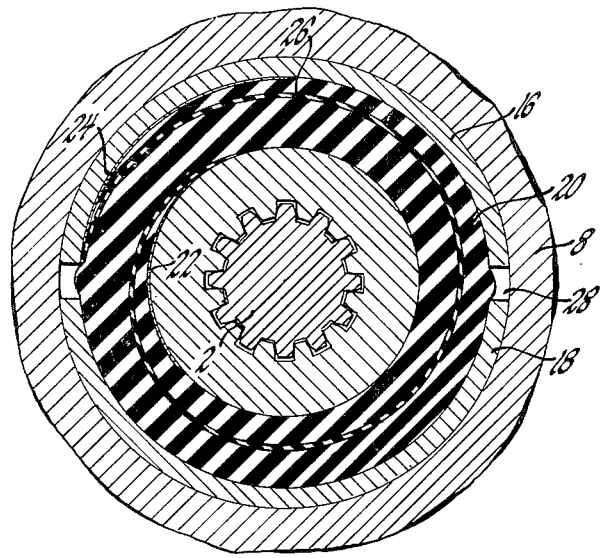

The above and other objects, features, and advantages of the invention will appear more clearly from the following detailed description thereof made with reference to the drawings in which:

FIGURE 1 is a side view in partial section of the preferred embodiment to the invention; and FIGURE 2 is a view of the FIGURE 1 embodiment taken on a line 2—2 of FIGURE 1.

Referring now to the drawings, the assembly shown comprises a driveshaft 2, suitably driven by a marine engine (not shown), and a propeller assembly 4 having blades 6 which extend radially from sleeve 8. The propeller sleeve 8 concentrically surrounds a hub 10 which is splined to the driveshaft 2 and which in effect, therefore, constitutes the end of the driveshaft. An outwardly extending annular flange 12 on the hub and an inwardly extending annular flange 14 on the sleeve form the end walls of an elongate annular chamber between the hub and the sleeve. This chamber accommodates a pair of almost semicylindrical friction shoes or elements 16 and 18 having their outer cylindrical surfaces in mating friction engagement with the sleeve 8. As can best be seen in FIGURE 2, the chamber also accommodates a sheet of elastomer material 20 which is concentrically wound around the hub 10 and which has an inner tapered end bonded to the hub as shown at 22 and an outer tapered end bonded to friction element 16 as indicated at 24. Because the elastomer sheet is relatively thick in its center portion and tapers gradually to each of its bonded end portions as shown, it can be compactly wound without voids between the sheet and the sleeve or between the sheet and the hub. Hence, the compactly wound sheet provides an outward radial pressure against the friction shoes 16 and 18. The surfaces of the sheet which are in abutting or adjacent relationship with each other in the wound assembly have interposed therebetween a thin layer of a suitable lubricant 26 to allow the concentrically wound layers of elastomer to slip with respect to each other.

As can be seen in FIGURE 2, the opposed ends of the friction shoes are slightly separated from each other to provide a space 28 therebetween; hence the pair of shoes can be radially expanded or contracted into and out of engagement with the sleeve, depending on the radial pressure applied to them by the spiraled elastomer sheet. Also, and with reference now to FIGURE 1, the axial length of the spiraled sheet is such as to leave small clearances 30 and 32 between the ends thereof and the flanges 12 and 14 respectively.

As regards materials, it is preferable that the metals for the sleeve 8 and the friction elements 16 and 18 be selected to provide a coefficient of friction between these elements on the order of .14 to .21. The friction elements can be made, for example, of hardened steel with a hardness of about 28 to 32 on the Rockwell C scale or of a suitable stainless steel, the latter particularly for salt water marine use, and the propeller can be made of bronze. The choice of metal for the other parts will, of course, be dictated by the requirements for strength, corrosion resistance, etc.; in marine application the need for corrosion resistance generally dictates the use of stainless steel or bronze. As the material for the spiraled sheet 20, I prefer to use either polychloroprene or butyl rubber, since they are eminently satisfactory in moist, oily environments such as is normal for marine propulsion system; however, other synthetic elastomer stocks such as Buna-N, or vulcanized natural rubber may be used for the sheet if desired. The sheet can be secured to the friction element and to the driving member either by direct vulcanization to the metal or by adhesives well known and readily available for such bonding. A resiliency of about 30 durometer is quite satisfactory for the usual outboard marine propellers, it being understood of course that the choice of resiliency for the elastomer sheet will depend on the precise torque transmitting characteristics desired in the particular system in which it is to be used. The interstice or boundary material between the wound layers of the elastomer sheet can be selected from a variety of materials to provide a low coefficient of friction between the layers. Examples of such materials are graphite; molybdenum disulfide; paraffin; petroleum jelly or grease; foil of lubricative metals such as lead, aluminum, tin, or the like; shock resistant plastics with lubricative properties such as Teflon, nylon, polyethylene, and certain of the phenolics; or mixtures or composites of the above, for example a mixture of griphite and paraffin wax. The lubricative layer can either be applied as a coating on the surface of the elastomer sheet, or it can be a separate sheet interposed between the wound spirals.

Operation of the device shown is as follows: During normal operation with no excessive torque demand from the propeller, the compact elastomer spiral maintains the friction shoes 16 and 18 in tight, non-slipping frictional engagement with the propeller sleeve 8, the compactness of the elastomer generally being evidenced by a slight bulge of its outer layer into the spaces 28 between the friction elements as shown in FIGURE 2. Hence, the rotary motion of the shaft is efficiently transmitted through the elastomer and friction shoes to the propeller with little or no slippage. If it occurs, however, that the propeller hits an obstruction or otherwise creates too high a torque demand for the propulsion system, the rotation of the shaft within the now substantially stationary sleeve 8 causes the spiraled elastomer sheet to wind up more tightly, each layer of the spiral being free to slip with respect to its abutting layer by reason of the lubricative barrier layer 26. Hence, the sheet shrinks slightly in a radial direction, thereby relieving the pressure from the friction shoes 16 and 18. This relieves the frictional engagement between the shoes and the propeller sleeve thereby allowing free slippage therebetween. During this period of tight wind up and resultant slippage, the elastomer sheet may of course expand slightly axially into the annular spaces 30 and 32. As soon as the obstruction is removed such that the propeller is free to turn, the elastomer spiral immediately slightly unwinds to its position for normal operation thereby exerting its usual radial pressure against the friction shoes with attendant re-engagement of the shoes into non-slipping contact with the sleeve 8. The relatively large area of frictional contact between the shoes and the sleeve contributes, of course, to the efficient operation of the device.

It will be seen, therefore, that the assembly provides an efficient torque transmitter during normal operation but with adequate provision for the slippage required to prevent any damage to the system in the event the torque demand from the driven member is too high for the capacity of the system. In addition to providing the desired slip characteristics, the resilient spiraled sheet also serves to inhibit the transmission of vibration or shock from the propeller to the driveshaft.

Whereas in the preferred embodiment shown only a single spiraled sheet of elastomer material is used, it will be understood that two or more such concentrically wound resilient sheets may be used if desired. Also, it will be evident that other changes and modifications may be made all within the preview of the invention and hence within the full and intended scope of the claims which follow.

I claim:
1. A slip clutch comprising a driving rotary member and a driven rotary member concentrically surrounding the driving member in spaced relationship thereto, a radially movable friction element engageable with said driven member, a concentrically wound resilient spiral disposed between said driving member and said friction element and having adjacent convolutions thereof in radial contact, and means securing inner and outer ends of said spiral respectively to said driving member and said friction element, said resilient spiral radially biasing the friction element into nonslipping frictional engagement with said driven member while the angular velocities of said members are substantially equal and relieving the radial bias on the friction element such that there is slippage between the friction element and said driven member in the event the rotary movement of the driven member ceases while that of the driving member continues.

2. A slip clutch comprising a driving member, a driven member with a sleeve surrounding said driving member, a resilient sheet concentrically spiraled around said driving member between said driving member and said sleeve and having adjacent convolutions thereof in radial contact and means securing inner and outer ends of said sheet respectively to said driving member and to a friction element engageable with said sleeve, said resilient sheet biasing said friction element into nonslipping frictional contact with said sleeve while the rotary velocities of said members are substantially equal and relieving the bias on said friction element such that there is slippage between the latter and said sleeve in the event the rotary movement of said driven member ceases while that of said driving member continues.

3. A slip clutch comprising a driving member, a driven member with a sleeve surrounding said driving member, and a resilient elastomer sheet concentrically spiraled around said driving member between said driving member and said sleeve, said sheet having its inner end secured to said driving member and its outer end secured to a friction element engageable with said sleeve, the spirals of said elastomer sheet having interposed therebetween a lubricant material.

4. A slip clutch comprising a driving member, a driven member with a sleeve surrounding said driving member, a resilient sheet concentrically spiraled around said driving member between said driving member and said sleeve, and means securing inner and outer ends of said sheet respectively to said driving member and to an at least partially cylindrical shaped radially movable friction element engageable with said sleeve, said sheet biasing said friction element into nonslipping frictional contact with said sleeve while the rotary velocities of said members are substantially equal and relieving the bias on said friction element such that there is slippage between the latter and said sleeve in the event that the rotary movement of said driven member ceases while that of said driving member continues.

5. A slip clutch comprising a driving member, a driven member with a sleeve surrounding said driving member, a pair of generally semicylindrical shaped friction shoes arranged to form a radially expansible generally cylindrical friction element in and engageable with said sleeve, a resilient elastomer sheet concentrically spiraled around said driving member between said driving member and said friction element, said sheet having its inner end secured to said driving member and its outer end secured to one of said friction shoes, and a layer of lubricant material between the spirals of said spiraled elastomer sheet, said elastomer sheet being relatively thick at its center portion and tapering gradually toward its inner and outer end portions.

6. A marine propeller comprising a hub, a sleeve surrounding said hub and having outwardly extending blades, a resilient sheet concentrically spiraled around said hub between said hub and said sleeve and having adjacent convolutions thereof in radial contact, and means securing inner and outer ends of said sheet respectively to said hub and to a friction element engageable with said sleeve, said resilient sheet biasing said friction element into nonslipping frictional engagement with said sleeve while the rotary velocities of the latter and said hub are substantially equal and relieving the bias on said friction element such that there is slippage between the latter and said sleeve in the event the rotary movement of said sleeve ceases while that of said hub continues.

7. A marine propeller comprising a hub, a sleeve having outwardly extending blades and concentrically surrounding the hub in spaced relationship therewith to form an annular chamber between the hub and sleeve, said hub and sleeve having annular flanges which form the end walls of said chamber, a radially movable at least partially cylindrical friction element in and engageable with said sleeve, a concentrically wound resilient elastomer sheet between said hub and said friction element, means securing inner and outer ends of said sheet respectively to said hub and said friction element, and a layer of lubricating material between the spirals of said spirally wound elastomer sheet, said resilient sheet biasing the friction element into nonslipping frictional contact with said sleeve while the rotary velocities of said hub and sleeve are substantially equal and relieving the bias on the friction element such that there is slippage between the friction element and the sleeve when the rotary movement of said sleeve ceases while the rotary motion of the hub continues.

8. A slip clutch comprising driving and driven rotary members, one of said members concentrically surrounding the other, a friction element engageable with one of said members, and a concentrically wound resilient spiral of elastomer material disposed between the other of said members and said friction element, means operatively connecting said spiral to the other of said members and said friction element, said resilient spiral biasing the friction element into non-slipping frictional contact with said one member while the rotary velocities of said members are substantially equal and relieving the bias on the friction element such that there is slippage between the friction element and said one member in the event the rotary movement of the driven member ceases while that of the driving member continues.

References Cited by the Examiner
UNITED STATES PATENTS

| | | | |
|---|---|---|---|
| 335,285 | 2/86 | Johnson. | |
| 667,872 | 7/01 | Locke | 64—30 X |
| 1,442,417 | 1/23 | Truebe. | |
| 1,856,135 | 5/32 | Nieman. | |
| 2,288,859 | 7/42 | Valentine. | |
| 2,633,923 | 4/53 | Hartz | 64—30 X |
| 2,995,907 | 8/61 | Orain | 64—11 |

FOREIGN PATENTS

| | | |
|---|---|---|
| 64,185 | 5/55 | France. |
| | | (1st addition to 1,079,278). |

ROBERT C. RIORDON, *Primary Examiner.*
FRANK R. SUSKO, *Examiner.*